United States Patent [19]

Osugi

[11] 4,226,278
[45] Oct. 7, 1980

[54] AUTOMATIC MOLTEN METAL SURFACE LEVEL CONTROL SYSTEM FOR CONTINUOUS CASTING MACHINES

[75] Inventor: Kozo Osugi, Tokyo, Japan

[73] Assignee: Furukawa Metals Co., Ltd., Tokyo, Japan

[21] Appl. No.: 959,639

[22] Filed: Nov. 13, 1978

[30] Foreign Application Priority Data

Nov. 25, 1977 [JP] Japan ............................... 52/141292
Jan. 13, 1978 [JP] Japan ................................... 53/2476

[51] Int. Cl.³ ............................................ B22D 11/16
[52] U.S. Cl. .................................... 164/449; 164/157
[58] Field of Search .................... 164/449, 155, 4, 157

[56] References Cited
U.S. PATENT DOCUMENTS

| | | | |
|---|---|---|---|
| 2,743,492 | 5/1956 | Easton | 164/449 X |
| 3,300,820 | 1/1967 | Tiskus et al. | 164/449 |
| 3,536,124 | 10/1970 | Hanas et al. | 164/449 |
| 3,842,894 | 10/1974 | Southworth et al. | 164/4 |

Primary Examiner—Robert D. Baldwin
Assistant Examiner—J. Reed Batten, Jr.
Attorney, Agent, or Firm—George B. Oujevolk

[57] ABSTRACT

A molten metal surface level in a mold type continuous casting machine is controlled with an improved responsiveness and high accuracy by means of a novel electrical control system comprising a servo mechanism incorporating a microcomputer or the like, means for processing an input signal thereto from a detector means at the molten metal surface to feedback thereto a controlling output and, optionally, an ITV camera for photographing the molten metal surface portion to produce binary-coded signals through a suitable processing means so that the molten metal surface level can be detected and controlled with higher accuracy.

3 Claims, 12 Drawing Figures

AUTOMATIC MOLTEN METAL SURFACE LEVEL CONTROL SYSTEM FOR CONTINUOUS CASTING MACHINES

BACKGROUND OF THE INVENTION

The present invention relates to a continuous casting machine such as a mold-type continuous casting machine that is used to continuously produce copper ingots having a diameter of, for example, 200 mm or a belt-wheel type continuous casting machine that continuously produces ingots having a smaller sectional size which are used for producing copper or aluminium rods and, more specifically, to an automatic molten metal surface level control system to maintain the surface of molten metal poured in such casting machines at a constant level with a high accuracy and improved responsiveness for improving the stability of the quality of ingots.

BRIEF DESCRIPTION OF THE PRIOR ART

As shown in FIG. 1, in the aforementioned mold-type continuous casting machine in general, molten metal 2 is fed into a molten metal reservoir 3 from a feed port 1 at a constant feeding rate and, then, poured into a mold 5 through a gate 4 opened at the bottom of the molten metal reservoir 3 and continuously cast into ingots. During this operation, it is extremely important to maintain the surface 6 of the molten metal poured in the mold 5 at a constant level for obtaining ingots of a stable quality.

While, in the aforementioned belt-wheel type continuous casting machine (not shown) in which a casting machine wheel that is rotated in a predetermined direction is provided in a position corresponding to the position of the aforesaid mold 5 and a belt that goes round in the same direction is provided in such a manner that molten metal is poured from said gate 4 into the space defined by said wheel and belt, the surface of the molten metal poured in said space must be maintained also at a constant level.

For this purpose, heretofore, it has been proposed to provide a controlling mechanism 9 comprising a controlling pin 7 facing the gate 4 and an operating means 8 that moves the controlling pin 7 vertically for controlling the aperture of the gate 4.

However, since the controlling mechanism 9 has been adjusted manually by workers in most cases, the molten metal surface 6 must be always kept under surveillance and the workers have been subjected to very difficult working conditions because such an operation of the controlling mechanism 9 must be done near the casting machine which is heated to a high temperature. In addition, the adjustment of the controlling mechanism 9 has not always been satisfactory in that variations are encountered when different workers make the manual adjustment.

As a remedy to such shortcomings, an automatic control over the controlling mechanism 9 has been carried out by using an electric control system including an electric motor and other means. In such an electric control system, the level of the molten metal surface 6 is continuously detected by an appropriate detecting means, or ON/OFF signals are generated correspondingly to the molten metal surface level and a controlling algorism is applied in accordance with the deviation of such signals from a command level of the molten metal surface 6, so that the controlling pin 7 or the gate slit can be controlled analogically by using an electric motor or air pressure to continuously adjust the aperture of the gate 4 and, thereby, to control the quantity of the molten metal poured out through the gate 4 for maintaining the molten metal surface 6 at a constant level.

The aforementioned method of continuously detecting the level of the molten metal surface 6 is difficult to execute with a high accuracy and at a low cost, and various modifications or adaptations thereof proposed so far are impracticable in many cases from an industrial standpoint. Therefore, in effect, the means for detecting the level of the molten metal surface through ON/OFF signals sampled at two or more positions of the molten metal surface are principally used.

To secure an improved accuracy in the last-mentioned surface level detecting means, it is necessary to provide a larger number of level sensors at discretely selected positions of the molten metal surface. However, the providing of such a larger number of level sensors adds to the cost so that in most cases, many of commercially operated systems adopt two level sensors at an upper and lower limits of the command level of the molten metal surface.

In the aforementioned two-point controlling scheme, however, if the controlling pin 7 is analogically driven by the electric control system, the sensing signal generated when the molten metal surface reaches the upper command limit level $h_1$ or lower command limit level $h_2$ showing a command deviation $\pm \Delta h$ from the command level H gives the controlling pin 7 a controlled variation that is obtained by multiplying a proportional signal or combined integral and differential signals of the aforesaid deviation $\Delta h$ by a certain factor. As a result thereof, the molten metal surface 6 is controlled to such a level that there is a further deviation by $+\alpha$ or $-\beta$ from the aforementioned upper command limit level $h_1$ or lower command limit level $h_2$, respectively, as shown in FIG. 2 due to the responsiveness of the electric control system and, thus, a higher accuracy has been in no way attainable in such a prior art system.

Since the aforementioned prior art electric control system which is set at fixed controlling constants cannot keep track of rapid changes in the level of the molten metal surface 6, it can neither be assured that the molten metal never overflows the mold 5 when its surface 6 rises excessively, nor that the system can be provided with a reliability to prevent substantially perfectly interior defects of ingots occurring when the molten metal surface falls too low.

SUMMARY OF THE INVENTION

The present invention has been achieved with a view to overcoming the aforementioned shortcomings of the prior art electric molten metal surface level control system.

Accordingly, the present invention has as its object to provide an improved automatic control system which takes advantage of a low-cost two-point controlling and which can control the aperture of the gate 4 with a high accuracy and improved responsiveness allowing the molten metal surface to be brought very close to the upper and lower command limits thereof and maintained thereat despite of the adoption of such a two-point controlling scheme.

DETAILED DESCRIPTION OF THE PREFERRED EMBODIMENTS

Hereinafter, the present invention will be described in detail by way of the preferred embodiments thereof with reference to the accompanying drawings, in which:

FIG. 9b is a waveform diagram for illustrating the principle of said comparator circuit of FIG. 9a.

Figure 1:
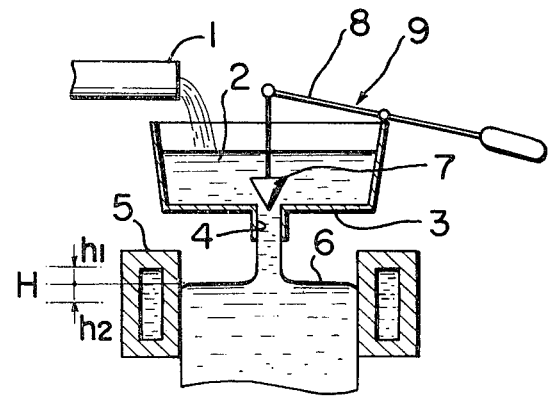
FIG. 1 is a schematic side section illustrating one example of continuous casting machines adopting a prior art molten metal surface level control system.
Figure 2:
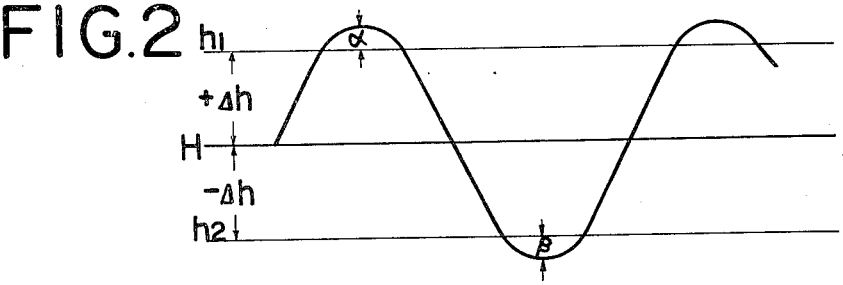
FIG. 2 is a chart illustrating a variation of the controlled surface level in the prior art molten metal surface level control system as shown in FIG. 1.
Figure 3:
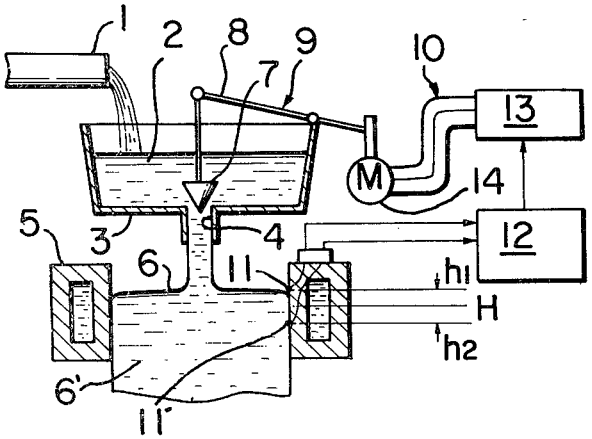
FIG. 3 is a schematic side section of a continuous casting machine adopting the automatic molten metal surface level control system according to the present invention, illustrating a circuit arrangement thereof connected to the casting machine.

Referring now to the drawings, especially to FIG. 3 illustrating a preferred embodiment of the electric control system 10 according to the present invention, in a continuous casting machine as previously described with reference to FIG. 1, level sensors 11 and 11' comprising a thermocouple or the like element for detecting the upper command limit level $h_1$ and lower command limit level $h_2$, respectively, are provided in the mold 5 at positions deviated by a vertical command deviation $\Delta h$ from the command level H to which the molten metal surface 6 is to be controlled, and these level sensors 11 and 11' are wired to a control unit 12 such as a microcomputer so that the latter can receive as its input the detecting signals produced by said level sensors 11 and 11'.

Then, the control unit 12 applies as its output a controlling pulse having a predetermined pattern to be described later to a controlling amplifier 13. The output of the controlling amplifier 13 is used to drive an electric motor 14 in reversible directions. Thus, the electric motor 14 of the electric control system 10 having the aforementioned arrangement moves upward or downward the controlling pin 7 of the aforementioned controlling mechanism 9.

Figure 4:
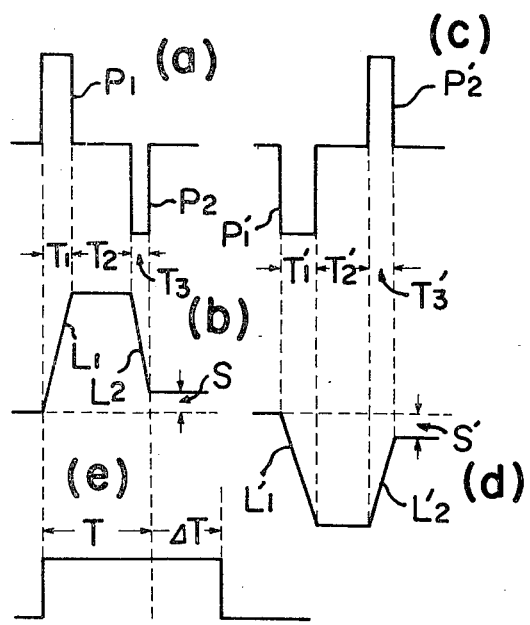
FIG. 4 is a chart illustrating the relationship of a controlling pulse, aperture and masking signal used in the system of FIG. 3 for controlling the aperture of the gate.

According to the present invention, the controlling pulse issued by the control unit 12 plays a very significant role. To describe this with reference to FIG. 4, when the level sensor 11 detects that the molten metal surface 6 has reached the upper command limit level $h_1$ and the control unit 12 receives a corresponding detecting signal generated by the level sensor 11, the control unit 12 issues a controlling pulse having a predetermined pattern as shown in FIG. 4(a).

In said predetermined pattern of the controlling pulse, an upper limit closing pulse $P_1$ lasts for a preset momentary time interval $T_1$ and, after a lapse of time $T_2$, an upper limit opening pulse $P_2$ lasting for another preset momentary time interval $T_3$ is issued. Thus, the oscillation period of the controlling pulse (T) is expressed as follows:

$$T = T_1 + T_2 + T_3.$$

Therefore, if the upper limit closing pulse $P_1$ is generated, the electric motor 14 or, instead thereof, an air cylinder or hydraulic valve is driven by the pulse $P_1$ to lower the controlling pin 7. Thus, the aperture of the gate 4 is brought very close to zero in a very short time as shown by the leading edge $L_1$ of the curve in FIG. 4(b), so that the molten metal surface 6 is brought very close to the command level H at a stroke as shown at $Q_1$ in FIG. 6.

Then, after a lapse of time $T_1 + T_2$, the upper limit opening pulse $P_2$ is issued to cause the controlling pin 7 to move upward for increasing the aperture of the gate 4 as shown by the trailing edge $L_2$ of the curve shown in FIG. 4(b). In this case, however, since the control unit 12 is preset for $T_1 > T_3$, the aperture of the gate 4 is not restored to the initial level that was found before the start of the foregoing controlling function, but the opening operation stops at such an aperture that is closed by S from said initial aperture level, as shown in FIG. 4(b).

Figure 6:
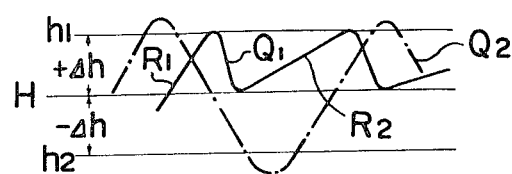
FIG. 6 is a chart, comparable with FIG. 2, illustrating a variation of the controlled surface level in the system according to the present invention.

In this manner, since the aperture of the gate 4 is controlled to a level which is a little smaller than that was found before said upper command limit $h_1$ was reached, the slope $R_2$ shown in FIG. 6 has a gradient smaller than that of the slope $R_1$ and, thus, the molten metal surface rises more slowly towards the upper command limit level $h_1$.

FIG. 4(e) shows a masking signal which functions to suppress the detecting signal receiving operation of the control unit 12 during the aforesaid oscillation period of the controlling pulse in which the controlling pin 7 is activated plus time $\Delta T$ ($T' + \Delta T'$ in the case of $h_2$ to be described later).

While, the control system according to the present invention is arranged so that when the level sensor 11' detects that the molten metal surface 6' has reached the lower command limit level $h_2$ and the control unit 12 receives a corresponding detecting signal, the control unit 12 generates a controlling pulse having a predetermined pattern as shown in FIG. 4(c).

In the aforesaid predetermined pattern of the latter controlling pulse, a lower limit opening pulse $P_1'$ lasting for a preset momentary time $T_1'$ occurs first and, after a lapse of time $T_2'$, a lower limit closing pulse $P_2'$ lasting for another preset momentary time interval $T_3'$ is generated. Thus, the oscillation period of the controlling pulse (T') is expressed as follows:

$$T' = T_1' + T_2' + T_3'.$$

In this course, if the lower limit opening pulse $P_1'$ is generated, the aforementioned electric motor 14 is driven so as to raise the controlling pin 7. Thus, the aperture of the gate 4 is brought very close to its fully-opened position in a very short time as shown by the leading edge $L_1'$ of the curve in FIG. 4(d), so that the molten metal surface 6 is brought very close to the command level H at a stroke.

Further, after a lapse of time $T_1' + T_2'$, the lower limit closing pulse $P_2'$ is issued to cause the controlling pin 7 to move downward for reducing the aperture of the gate 4 as shown by the trailing edge $L_2'$ of the curve shown in FIG. 4(d). In this case, however, since the control unit is preset for $T_1' > T_3'$, the aperture of the gate 4 is not restored to the initial level that was found before the start of the foregoing controlling function, but the closing operation stops at such an aperture that is opened by S' from said initial aperture level, as shown in FIG. 4(d). In the same way as described with reference to FIG. 6 for the case in which the molten metal surface 6 reaches the upper command limit level $h_1$, the molten metal surface 6 has its level controlled between said H and $h_2$.

Further, in starting the aforementioned function of the control system, the time intervals $T_1$, $T_2$ and $T_3$, $T_1'$, $T_2'$ and $T_3'$ of the controlling pulse, and the masking time $T + \Delta T$ of the masking signal may be tabulated as an adjustable constant table in various combinations beforehand, so that, for example, when the control unit 12 has received a detecting signal indicating that the molten metal surface 6 has again reached the upper command limit level $h_1$ immediately after reaching said level $h_1$ as shown in FIG. 6, the molten metal surface 6 can be adjusted to the command level with a higher accuracy by increasing the sum of the combined parameters $T_1$, $T_2$ and $T_3$ in FIG. 4(a) upon reception of the second detecting signal to a value larger than the sum of the first parameter combination for increasing the gradient of the slope $Q_2$ above that of the slope $Q_1$ shown in FIG. 6.

As an experimental example of the aforementioned control system as applied to production of ingots at a molten metal feeding rate of 20,000 cc/min with a mold of 200 mm diameter, when the level sensors were provided in the mole with a command deviation of ±5 mm and a microcomputer was used as the control unit 12 and the system was programmed for controlling the molten metal surface as $T_1 = 0.3$ sec., $T_2 = 1.0$ sec., $T_3 = 0.2$ sec. and $\Delta T = 1.0$ sec., and $T_1' = 0.4$ sec., $T_2' = 1.5$ sec., $T_3' = 0.3$ sec and $\Delta T' = 0.5$ sec., the molten metal surface level could be controlled to ±7 mm of the command level.

Figure 5:
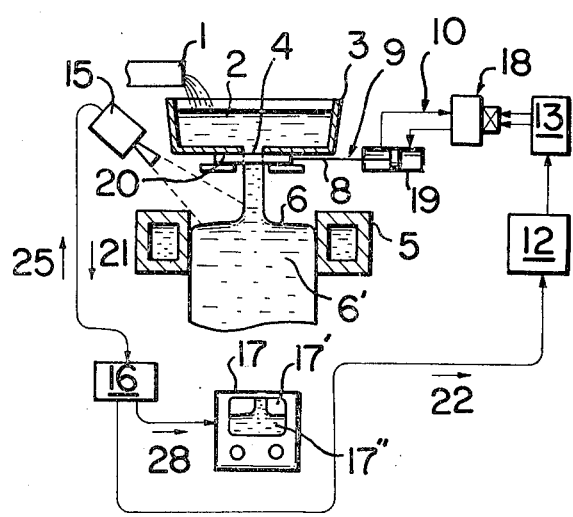
FIG. 5 is a schematic view of another preferred embodiment of the molten metal surface level control system according to the present invention, illustrating the circuit arrangement thereof connected to the continuous casting machine.

Referring now to FIG. 5 illustrating another preferred embodiment of the electric control system 10 and controlling mechanism 9 according to the present invention, this latter preferred embodiment differs from the first preferred embodiment shown in FIG. 3 in that an ITV camera 15 is provided for photographing the molten metal surface 6 and the output of the ITV camera 15 is fed to a processing circuit 16, which in turn applies a surface level signal to the control unit 12, and in that a monitor section 17 is connected to said processing circuit 16. Further, instead of the electric motor 14, a hydraulic cylinder 19 associated with a hydraulic mechanism 18, and a slide section 20 constituting the controlling mechanism 9 is driven by the hydraulic cylinder 19 so as to adjust the aperture of the gate 4.

To describe the aforementioned latter electric control system 10 in greater detail, the output of the ITV camera shown in FIG. 5 is applied to the processing circuit 16 as an input signal thereto. Then, the processing circuit 16 generates the surface level signal 22 which is fed to the control unit 12. As the processing circuit 16, a circuitry having an arrangement as shown in the block diagram of FIG. 10 may be adopted.

As an experimental example of the latter control system as applied to a casting machine producing copper ingots having a diameter of 200 mm, where molten metal 1 was poured through the gate 4 of 10 mm diameter at about 20 cc/sec., an ITV camera provided with a telephotographic lens having a focal distance of 750 mm was installed at a position 12 m away from the molten metal surface 6.

Figure 7:
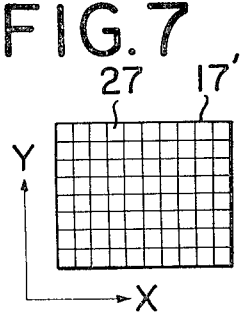
FIG. 7 is a front view of an image screen of a monitor section adopted in the system of FIG. 5, illustrating picture elements formed on said image screen.
Figure 10:
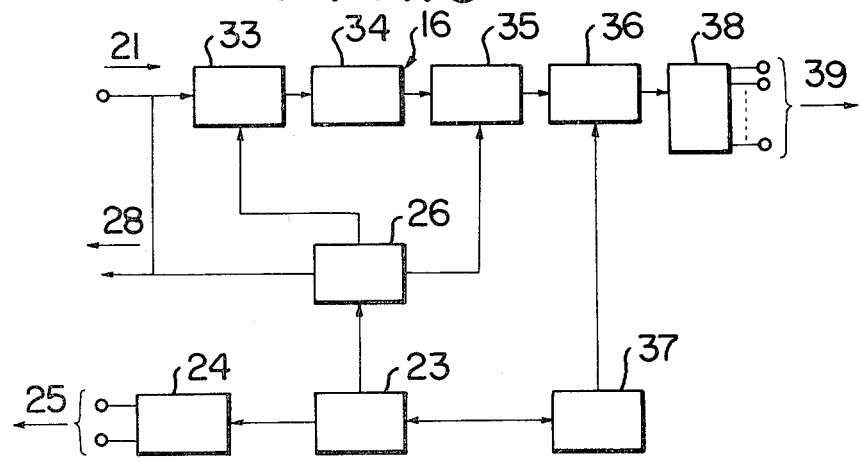
FIG. 10 is a block diagram of one example of the processing circuits adopted in the system of FIG. 5.

Referring now to FIG. 10, 23 is a 6 MHz reference frequency oscillator having one output thereof connected to a synchronizing signal generator circuit 24 which in turn generates vertical and horizontal synchronizing signals 25 that are supplied to the ITV camera 15 to set the scanning speed of the same. The other output of the reference frequency oscillator 23 is fed to a picture element divider circuit 26 which generates timing pulses that are used to divide the image screen 17 (monitor screen) into a required number of picture elements 27 each comprising a defined zone obtained by dividing the screen into an odd number of sections of about more than ten sections both along the X and Y-axis thereof so as to form a lattice pattern, as shown in FIG. 7.

The signal 21 fed from the ITV camera 15 is combined with one output of the picture element dividing circuit 26 and the resultant signal 28 is applied to the input of the monitor section 17. Thus, on the monitor section 17, an image 17'' derived from the input signal 21 and detecting marks such as 29, 30, 31 and 32 of a desired plurality of picture elements selected out of the aforesaid required number of picture elements are shown in FIG. 8b are displayed.

Figure 8A:
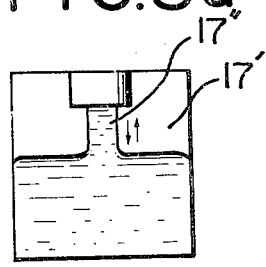
FIG. 8a is a front view of said image screen on which an image of the molten metal surface is displayed.
Figure 8B:
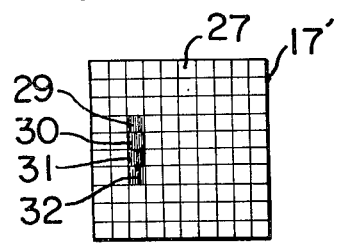
FIG. 8b is another front view of said image screen on which detecting marks of selected picture elements are displayed.

In this case, as shown in FIGS. 8(a) and 8(b), a plurality of picture elements are selected and arranged so that at least one thereof corresponds to a zone of the molten metal surface 6 to be displayed as a detecting mark 29 and remaining picture elements correspond to a zone indicated at 6' in FIG. 5.

Figure 9A:
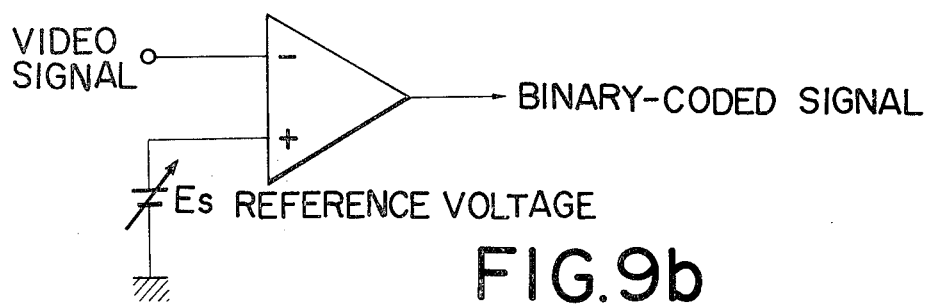
FIG. 9a is a wiring diagram of a comparator circuit adopted in the system of FIG. 5.
Figure 9B:
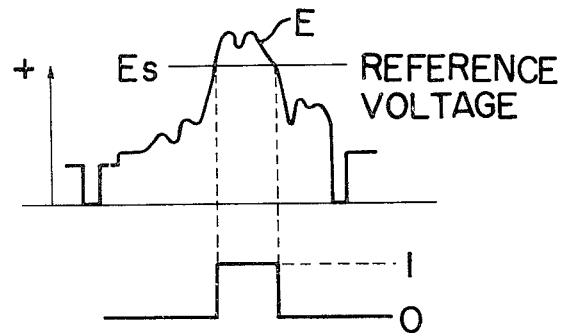

As shown in FIG. 10, to an amplifier-clamping circuit 33 to which the signal 21 is applied as an input thereof, a comparator circuit 34 is connected, to which a discriminator circuit 35 is connected. In this circuit, as said input signal 21 is applied thereto, a gate pulse is generated each time that portion corresponding to the aforementioned selected picture element is scanned so that about ten separate scanning lines (line elements) are sampled and, as shown in FIG. 9(b), the level E of an input signal (image signal) corresponding to said line element is compared with a preset reference voltage Es to obtain a binary-coded signal comprising "0" or "1". These binary-coded signals are temporarily stored in a memory and, upon completing the scanning of said line elements, the number of line element signals that were binary-coded into "1" are counted out of the memory content. When said counts exceed a preset number, an output signal indicating that the symbolic value of the binary-coded signal of said picture element is "1" is generated. In this manner, the binary state (black or white) of the entirety of the thus detected mark zone is discriminated.

Since the image screen is divided into picture elements in the aforementioned manner, a filtering effect against minor variation of the images in the picture elements can be obtained and, therefore, the S/N ratio which is often controversial in the detection system of this type is remarkably improved.

The comparator circuit 34 is arranged so that the reference voltage Es can be set at a desired level. While, it is preferable to arrange the picture element divider circuit 26 in such a manner that the picture elements can be selected as desired so that when the wall of the gate 4 is deformed by being melted into the molten metal over a long period of use and, due to this, the position of the image as shown in FIG. 8a goes out of place from the position of the detecting mark as shown in FIG. 8b, such a discrepancy can be readily corrected.

Further, as shown in FIG. 10, a memory circuit 36 is connected to the output of the discriminator circuit 35, and the other output of the aforementioned reference frequency oscillator 23 is applied to a dynamic controller 37. The dynamic controller 37 generates a sampling pulse which is fed to the memory circuit 36 in such a manner that the output of the discriminator circuit 35 is read into said memory circuit 36 at every sampling time of, for example, 0.5 sec. or 0.1 sec. to be held therein until the next sampling time.

The thus held signal is fed to an output circuit 38 connected to the output of the memory circuit 36, to be converted into a surface level signal 39 constituting an external output signal (open collector or relay signal).

Thus, when the molten metal surface portion 6' is photographed by the ITV camera 15 as shown by the image 17" of FIG. 8a, the image of the molten metal surface portion 6' rapidly tracks the molten metal surface 6 moving in the direction of arrow, because the picture elements are selected as shown in FIG. 8b. Therefore, every time the image reaches or leaves the preset detecting marks 29, 30, 31 and 32, a symbolic value of binary-coded signal is obtained. Then, the symbolic value derived from each of said plurality of picture elements is input to a control unit such as a computer, where it is logically processed. In this arrangement, for example, even if the detecting mark 29 detects an image when the detecting mark 32 does not detect the same, this does not means a detection of molten metal, but means an erroneous detection of an image, such as flame image, other than the molten metal. The aforementioned logical processing eliminates the possibility of such an erroneous detection of the molten metal surface level and provides a high reliability of detection.

In the aforementioned detecting system, since an ITV camera has a telephotographic lens, the detection accuracy can be increased by changing the focal distance of the lens and, also, the possibility of erroneously detecting burner flame having, for example, an intense bluish light may be eliminated by attaching to the lens a filter that passes only those lights defined in a particular wavelength band.

In the latter preferred embodiment of the electric control system 10 according to the present invention as described hereinbefore, the molten metal surface portion 6' including the molten metal surface 6 is photographed by the ITV camera 15 at some distant position along a direction permitting the surveillance of the molten metal surface 6 poured in the mold 5. From a required plural number of picture elements obtained by horizontally and vertically dividing the image screen 17' in the monitor section of the ITV camera, a plurality of picture elements corresponding to said molten metal surface portion are selected in such a manner that at least one thereof corresponds to said molten metal surface 6. Then, input signals from the ITV camera corresponding to the respective picture elements are compared with a preset reference signal so as to encode each line element of each picture element into a binary signal. When the number of the binary-coded signals "1" exceed a preset number, an output signal indicating that the symbolic value of that particular picture element is a binary "1" is issued. Then, the output signals associated with said plurality of picture elements are subjected to a logical processing to detect the level of the molten metal surface 6. Thus, since the molten metal surface 6 is monitored through the ITV camera positioned at some distance and the image thereof is processed by way of electric signals, the detection processing can be effected at a higher speed and a rapid change in the moten metal surface 6 can be detected at a higher accuracy as compared with the conventional system using radioactive rays. Further, since detecting marks which can be selected on the image screen of the monitor section as desired are provided, the surface detecting accuracy may be improved by enlarging the image. Also, the provision of a plurality of said detecting marks in combination with the logical processing of the image signals eliminates the possibility of erroneously detecting as the molten metal surface an object that is not the molten metal surface in actuality, such as splashed molten metal.

Furthermore, according to the present invention, since a high degree of freedom in the location of the arrangement herein described is possible, the detecting equipment can be set at some distance from the molten metal surface. The instruments can then be protected so that they are not adversely affected by heat.

Also, since the picture elements are selected as desired, the detecting position range may be set at any place on the image screen. Thus, even if the molten metal surface is inclined, only the detecting marks may be required to be set obliquely and, therefore, no limitation is imposed on the positional relationship between the ITV camera and the object to be photographed thereby.

In carrying the present invention into practice, it is to be observed that the control system may be arranged in such a manner that the level of the molten metal surface 6 is detected in synchronization with level position signals which are generated intermittently.

In the control system according to the present invention, control pulses are generated in a predetermined pattern so as to control the aperture of the gate 4 so that the molten metal surface 6 is brought close to the command level H for a moment. Thereafter, the gate 4 is controlled to such an aperture that it is opened or closed a little from the initial aperture that executed before the controlling operation. Thus, not only the electric control system 10 can have an improved response, but also can accomplish a highly accurate controlling function with high accuracy to the upper and lower command limit levels by using detecting signals derived from only two points, and the required parameters can be set in a practical and simple manner.

What is claimed is:

1. In a continuous casting machine for producing ingots having a predetermined sectional area in which molten metal is continuously fed into a molten metal reservoir at a predetermined feed rate and said molten metal in said reservoir is poured into a continuous casting mold through a gate in said reservoir, said reservoir having an aperture that is adjustable under the control of an electric control mechanism, an automatic molten metal surface level control system for the continuous casting machine comprising: upper and lower electric level detecting means that detect that the molten metal surface in said casting mold has reached an upper command limit level or a lower command limit level, and a middle command level between said upper and lower limit levels, each of said upper and lower limit levels having a vertical command deviation from said middle command level; and, a signal generator, coupled to said level detecting means to generate controlling pulses having a predetermined pattern so arranged that when said molten metal surface has reached said upper command limit level the aperture of said gate is first brought to a substantially fully-closed position for a moment's time so as to bring down said molten metal surface to about said middle command level and then said gate is opened to a position that is closed slightly more from the initial aperture before the foregoing control operation, and, when said molten metal surface has reached said lower command limit level, the aperture of said gate is first brought to almost a fully-opened position so as to bring said molten metal surface up to about said middle command level and then, said gate is partially closed to the extent that it is slightly more closed than before the foregoing controlling operation.

2. An automatic molten metal surface level control system for the continuous casting machine according to claim 1, including adjusting means wherein said controlling pulses having said predetermined pattern can be adjusted as desired.

3. An automatic molten metal surface level control system for the continuous casting machine according to claim 1, including time means wherein when two or more said signals indicating said level detection are generated in succession, the oscillation period of controlling pulse corresponding to the next succeeding signal is increased to a period longer than that of the controlling pulse corresponding to said signal indicating said detection immediately preceding thereto.

* * * * *